(12) United States Patent
Svedine

(10) Patent No.: US 12,735,281 B2
(45) Date of Patent: Sep. 15, 2026

(54) SYSTEM FOR DELIVERING STORAGE CONTAINERS

(71) Applicant: Autostore Technology AS, Nedre Vats (NO)

(72) Inventor: Lucas Svedine, Denver, CO (US)

(73) Assignee: AutoStore Technology AS, Nedre Vats (NO)

( * ) Notice: Subject to any disclaimer, the term of this patent is extended or adjusted under 35 U.S.C. 154(b) by 328 days.

(21) Appl. No.: 18/326,225

(22) Filed: May 31, 2023

(65) Prior Publication Data

US 2024/0400321 A1 Dec. 5, 2024

(51) Int. Cl.
*B65G 67/04* (2006.01)
*B65G 1/04* (2006.01)

(52) U.S. Cl.
CPC ........... *B65G 67/04* (2013.01); *B65G 1/0478* (2013.01); *B65G 2814/0302* (2013.01)

(58) Field of Classification Search
CPC .................. B65G 67/00; B65G 1/0478; B65G 2814/0302
See application file for complete search history.

(56) References Cited

U.S. PATENT DOCUMENTS 11,873,014 B2 * 1/2024 Austrheim ........... B65G 1/0414
12,049,358 B2 * 7/2024 Clarke .................. B65G 57/03
(Continued)

FOREIGN PATENT DOCUMENTS

EP 3115319 A1 1/2017
NO 317366 B1 10/2004
(Continued)

OTHER PUBLICATIONS

Thenert, Alexander, International Search Report in PCT/EP2024/064968, mailed Sep. 6, 2024, 5 pages, European Patent Office, Rijswijk, Netherlands.

(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A system for delivering storage containers comprises a carrier framework for integration into a cargo compartment of a vehicle, and a transfer platform, wherein the carrier framework is a spatial framework configured to store a plurality of storage containers to be delivered in a plurality of individual storage spaces forming a carrier grid having vertical carrier columns, wherein the carrier framework comprises at least one access device configured to selectively present the individual storage containers received by and stored in the carrier framework to a user outside the carrier framework or outside a vehicle into which the carrier framework is integrated, wherein the transfer platform is connectable to or integratable into a framework structure of a storage grid of an automated storage and retrieval system to form a cantilever structure at the storage grid, beneath which the carrier framework or a vehicle, into which the carrier framework is integrated, is placeable, wherein the transfer platform has a transfer grid having a plurality of transfer grid cells, for receiving a storage container from or for sending a storage container into the framework structure of the storage grid, wherein the transfer grid cells are open at their bottom, and wherein the carrier grid and the transfer grid correlate in their horizontal cell arrangement and cell size, such that, when the carrier columns are arranged beneath the transfer grid cells, storage containers can be lowered from the transfer platform into the carrier framework.

14 Claims, 7 Drawing Sheets

(56) References Cited

U.S. PATENT DOCUMENTS

| | | | | |
|---|---|---|---|---|
| 12,071,167 | B2 * | 8/2024 | Austrheim | B65G 1/0464 |
| 12,071,307 | B2 * | 8/2024 | Ingram-Tedd | B65G 1/0492 |
| 12,116,771 | B2 * | 10/2024 | Rafezy | E04B 1/3445 |
| 12,179,807 | B2 * | 12/2024 | Austrheim | B65G 1/0471 |
| 12,214,978 | B1 * | 2/2025 | Smith | B65G 1/065 |
| 12,371,261 | B1 * | 7/2025 | Sengupta | B25J 5/02 |
| 2016/0145058 | A1 * | 5/2016 | Lindbo | B65G 1/0457 700/218 |
| 2018/0162639 | A1 | 6/2018 | Ingram-Tedd et al. | |
| 2020/0231381 | A1 * | 7/2020 | Lindbo | A62C 35/68 |
| 2022/0041372 | A1 | 2/2022 | Austrheim | |
| 2022/0306383 | A1 | 9/2022 | Fjeldheim et al. | |
| 2024/0286842 | A1 | 8/2024 | Skålerud | |
| 2025/0127297 | A1 * | 4/2025 | Norman | B65G 1/10 |

FOREIGN PATENT DOCUMENTS

| | | | |
|---|---|---|---|
| WO | 2014/075937 | A1 | 5/2014 |
| WO | 2014/090684 | A1 | 6/2014 |
| WO | 2015/193278 | A1 | 12/2015 |
| WO | 2018/146304 | A1 | 8/2018 |
| WO | 2019/206487 | A1 | 10/2019 |
| WO | 2023274864 | A1 | 1/2023 |

OTHER PUBLICATIONS

Wittmann-Regis, Agnés, International Preliminary Report on Patentability in PCT/EP2024/064968, mailed Dec. 2, 2025, 8 pages, European Patent Office, Geneva, Switzerland.

* cited by examiner 108
301
611
609,610
608
600
602
107
605
601
617
616
615
612
102
603
104
618
606
607
613
625
620
619
614
100
604

604
605
609
603
605
616
610
100
604
605
617
612

601
619
621c
623
622
620
621b
621a
624
I
620
II
601

620
700
625
625
804
801
801
800
802
803
801
801
104
602
606
100

SYSTEM FOR DELIVERING STORAGE CONTAINERS

FIELD OF THE INVENTION

The present invention relates to a system for delivering storage containers, to an automated storage and retrieval system, and to a method for delivering storage containers.

BACKGROUND AND PRIOR ART

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201*a*,301*a*,401*a* and first and second sets of wheels 201*b*, 201*c*, 301*b*, 301*c*, 401*b*, 401*c* which enable the lateral movement of the container handling vehicles 201,301,401 in the X direction and in the Y direction, respectively. In FIGS. 2, 3 and 4 two wheels in each set are fully visible. The first set of wheels 201*b*,301*b*, 401*b* is arranged to engage with two adjacent rails of the first set 110 of rails, and the second set of wheels 201*c*,301*c*,401*c* is arranged to engage with two adjacent rails of the second set 111 of rails. At least one of the sets of wheels 201*b*, 201*c*, 301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body 201*a* in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage compartment may comprise a cavity arranged internally within the vehicle body 201*a*,401*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110,111 may comprise two parallel tracks. In other rail systems 108, each rail in one direction (e.g. an X direction) may comprise one track and each rail in the other, perpendicular direction (e.g. a Y direction) may comprise two tracks. Each rail 110,111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns are storage columns 105, i.e. columns 105 where storage containers 106 are stored in stacks 107. In addition to storage columns 105, there are special-purpose columns within the framework structure. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

EP 3 115 319 A1 discloses a storage system, including a delivery port, arranged on a trailer.

SUMMARY OF THE INVENTION

The present invention is set forth and characterized in the independent claims, while the dependent claims describe other characteristics of the invention.

In one aspect, the invention is related to a system for delivering storage containers, comprising a carrier framework for integration into a cargo compartment of a vehicle, and a transfer platform, wherein the carrier framework is a spatial framework configured to store a plurality of storage containers to be delivered in a plurality of individual storage spaces forming a carrier grid having vertical carrier columns, wherein the carrier framework comprises at least one access device configured to selectively present the individual storage containers received by and stored in the carrier framework to a user outside the carrier framework or outside a vehicle into which the carrier framework is integrated, wherein the transfer platform is connectable to or integratable into a framework structure of a storage grid of an automated storage and retrieval system to form a cantilever structure at the storage grid, beneath which the carrier framework or a vehicle, into which the carrier framework is integrated, is placeable, wherein the transfer platform has a transfer grid having a plurality of transfer grid cells, for receiving a storage container from or for sending a storage container into the framework structure of the storage grid, wherein the transfer grid cells are open at their bottom, and wherein the carrier grid and the transfer grid correlate in their horizontal cell arrangement and cell size, such that, when the carrier columns are arranged beneath the transfer grid cells, storage containers can be lowered from the transfer platform into the carrier framework.

The carrier framework may be understood as a structure for carrying storage containers separate from a framework structure of an automated storage and retrieval system. It may be integrated into a delivery vehicle, such as a van, a truck, or the like, for example into a cargo compartment or into a box that is latchable onto a loading platform of the vehicle and may thus constitute or provide a cargo compartment. By providing a separate carrier framework, several storage containers can be delivered to a recipient instead of requiring a user to physically access a port attached or coupled with the automated storage and retrieval system.

The design of the carrier framework may be similar to the design of the frame work structure of the automated storage and retrieval system. It may comprise upright members and a carrier storage volume comprising vertical carrier columns arranged in rows between the upright members. In the carrier columns storage containers can be stacked one on top each other to form stacks. As explained further below, the individual storage containers may also be supported by other elements, such as a base of an individual drawer or a set of pins. Thus, the storage containers in a stack in the carrier framework are not necessarily stacked onto each other directly, but may have gaps inbetween them.

The integration into a vehicle is to be understood as attaching the carrier frame into a structure of the vehicle or into a structure that is connectable to the vehicle.

The transfer platform is a structural assembly that can be attached to the framework structure of an automated storage and retrieval system. Preferably, in the attached state, a top side of the transfer platform is flush with a top side of the framework structure. The transfer platform may be understood as an extension of an existing framework structure or a modification of an existing framework structure. Thus, by attaching the transfer platform to the framework structure, the carrier framework can be placed beneath a section of the extended or modified framework structure, such that storage containers being lowered from the transfer platform can reach the carrier framework.

Depending on the size of the carrier framework, a plurality of individual storage spaces is defined. In this context, a storage space is to be understood as a section inside the framework that is dimensioned corresponding to a storage container. Preferably, the storage spaces are equally dimensioned. However, some of the storage spaces may be larger than others, in particular they may have larger heights than the others. The individual storage spaces may be dimensioned to correspond to a common storage container for the AutoStore grid-based storage and retrieval system and similar systems. The interior dimensions may be 600×400 mm (millimeters) at various heights, for example 200 mm, 310 mm or 400 mm. The exterior dimensions exceed these measures and may be 650×450 mm at heights of 220 mm, 330 mm or 425 mm.

For accessing the storage containers, the carrier framework comprises the at least one access device. Preferably, each storage space is associated with an individual access device, which enables the system to allow access to each individual storage container without much effort. As explained further below, the access devices may be arranged at two opposite sides of the vehicle and reach into the individual storage spaces. Thus, each storage space may directly be accessible.

The at least one access device is preferably configured to present the respective storage container, but to prevent a removal of the storage container. A user at the respective vehicle or carrier framework may thus remove the contents of a storage container that is presented by an access device, but cannot remove the storage container itself.

The spacing of the transfer grid cells may correspond to the spacing of the storage grid. This means, the size of the transfer grid cells preferably correspond to the size of the storage grid cells. The arrangement of the transfer grid cells follow the general arrangement of the storage grid cells in a spatial grid. The transfer grid may, however, be limited to a single horizontal layer of grid cells. The grid cells may be open at their bottom sides, thus allowing to pass storage containers therethrough.

For being able to transfer the storage containers from the transfer platform into the carrier framework, the horizontal spacing and sizes of the carrier grid cells correspond to those of the transfer grid cells. Resultantly, each of the carrier columns can be placed beneath one of the grid cells.

A remotely operated vehicle may retrieve a certain storage container from inside the storage grid and lift it up. Afterwards, it may move to the transfer platform to a position above a desired carrier column. By lowering the storage container through one of the transfer grid cells, the desired carrier column is reached.

The transfer platform may have a horizontal footprint that at least corresponds to a horizontal footprint of the carrier. It is preferred that the transfer platform has a size that corresponds to or exceeds the size of all vehicles that may be used to transfer storage containers into. The control system of the automated storage and retrieval system may be configured to receive an information about the size of the respective vehicle, and the setup of the carrier framework inside the vehicle. The control system may then be configured to control the remotely operated vehicle to transfer the desired storage containers to the correct positions on the transfer platform, which correspond to carrier columns underneath.

The transfer platform may have at least one set of transfer platform rails arranged on a top side of the transfer platform for allowing a remotely operated vehicle to move on the transfer platform for moving a storage container on the transfer platform, wherein the at least one set of transfer platform rails may be connectable to a rail set of an automated storage and retrieval system, and wherein the transfer grid cells may have at least one opening configured to allow a remotely operated vehicle to pass a storage container vertically therethrough. The rail system of an automated storage and retrieval system may be extended by the transfer platform rails. Using the same grid setup allows the remotely operated vehicles to pass from the rail system over the storage grid to the transfer platform and back, without having to consider interruptions of rails or the like.

The system may comprise a guiding apparatus arranged on top of the carrier framework or above the carrier framework for guiding a storage container that is moved vertically from the transfer platform into the carrier framework. This may, for example, be a funneling frame on top of the carrier framework to slightly adjust the movement of the storage containers, if their horizontal position during the lowering process is slightly shifted.

The at least one access device may comprise a drawer having a drawer compartment for accommodating a storage container, wherein the drawer may be movable between a receiving position for receiving the storage container, and a picking position for presenting the storage container to a user, and wherein the drawer may be fully retracted into the carrier framework in the receiving position. The drawer is preferably configured to hold the storage container and to prevent removal of the storage container. The drawer may be a substantially box-like device that can be pulled out of the carrier framework or the side of the vehicle in a lateral direction. It may comprise drawer slides attached to the carrier framework. A front of the drawer may be flush with a lateral outer skin of the vehicle when in the receiving position. In the receiving position, a storage container can be lowered into the respective drawer as explained above. Also, the vehicle can safely travel when the drawers are in the receiving position. In the receiving position, which may also be referred to as a storage position, the drawers may be latched to avoid inadvertent opening during motion of the vehicle.

An access device having a drawer may be located in each of the individual storage spaces of the carrier framework. Hence, each storage container to be delivered by the vehicle can be placed in an individual drawer.

The carrier framework or a vehicle into which the carrier framework is integrated may be movable and arrestable in a predetermined position relative to the transfer platform. The arresting may be done by the vehicle itself, i.e. through a vehicle brake. However, it may be conceivable to latch the carrier framework or the vehicle to the transfer platform, to the ground or to a structure coupled with the ground once it has reached its final position.

The system may comprise a control arrangement configured to align the carrier unit relative to the transfer platform. The control arrangement may comprise a control device, a movable vehicle platform, and a set of actuators coupled with the movable vehicle platform and a fixed part, such as the ground. The control device may operate the actuators in a way that a vehicle, which stands on the vehicle platform, is aligned relative to the transfer platform by moving the vehicle platform to position the carrier columns flush with the transfer grid cells. The control device may be coupled with a camera, which views onto the vehicle platform to detect a position deviation and to enable a control.

The system may comprise a vehicle, wherein the carrier framework may be integrated into the vehicle, wherein the vehicle may have a vehicle opening above the carrier framework for vertically moving a storage container therethrough into or out of the carrier framework. The vehicle may be a van, or a truck. Preferably, the opening may be closable by a closure device, which may be electrically, hydraulically, or manually driven. The carrier framework arranged in the vehicle and having a plurality of access devices may be referred to a delivery port. Storage containers may be delivered to end-customers, who may directly access the contents of the storage containers through the respective access devices.

In a second aspect, the invention concerns an automated storage and retrieval system, comprising a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells, each comprising a grid opening defined by a pair of neighboring rails of the first set of rails and a pair of neighboring rails of the second set of rails; a storage grid having a framework structure configured to store a plurality of storage containers in stacks in vertical storage columns, which are provided between upright members, wherein each storage column is located vertically below a grid opening beneath the rail system; at least one remotely operated vehicle for handling a storage container, the at least one remotely operated vehicle being configured to move on the rail system above the storage columns; and at least one system for delivering storage containers according to the description above; wherein the transfer platform may be connected to or integrated into the framework structure.

The remotely operated vehicle may be configured to move a storage container from the storage grid to the transfer platform.

In a third aspect the invention is directed to a method for delivering a storage container, comprising arranging a vehicle, which comprises a cargo compartment having a carrier framework, at a transfer platform, which is connected to a framework of a storage grid of an automated storage and retrieval system, retrieving at least one storage container from the storage grid by a remotely operated vehicle operating on the automated storage and retrieval system, moving the at least one storage container to the transfer platform, and moving the at least one storage container from the transfer platform into the carrier framework by means of the remotely operated vehicle, wherein the carrier framework comprises at least one access device configured to selectively present the at least one storage container from outside the carrier framework or from outside the vehicle into which the carrier framework is integrated.

Arranging the vehicle may comprise arranging the vehicle beneath a cantilever structure of the transfer platform.

The remotely operated vehicle may lower the at least one storage container from the transfer platform through an opening above the carrier framework into the carrier framework.

The system for delivering storage containers may be provided as a retrofit to an existing automated storage and retrieval system. An existing storage grid may then be equipped with a new functionality in order to provide an end customer delivery. In a fourth aspect, the invention is directed to a method for transforming a warehouse having a grid-based automated storage and retrieval system into an end customer delivery arrangement, comprising providing a system according to the above, and connecting the transfer platform of the system to a framework structure of the automated storage and retrieval system.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
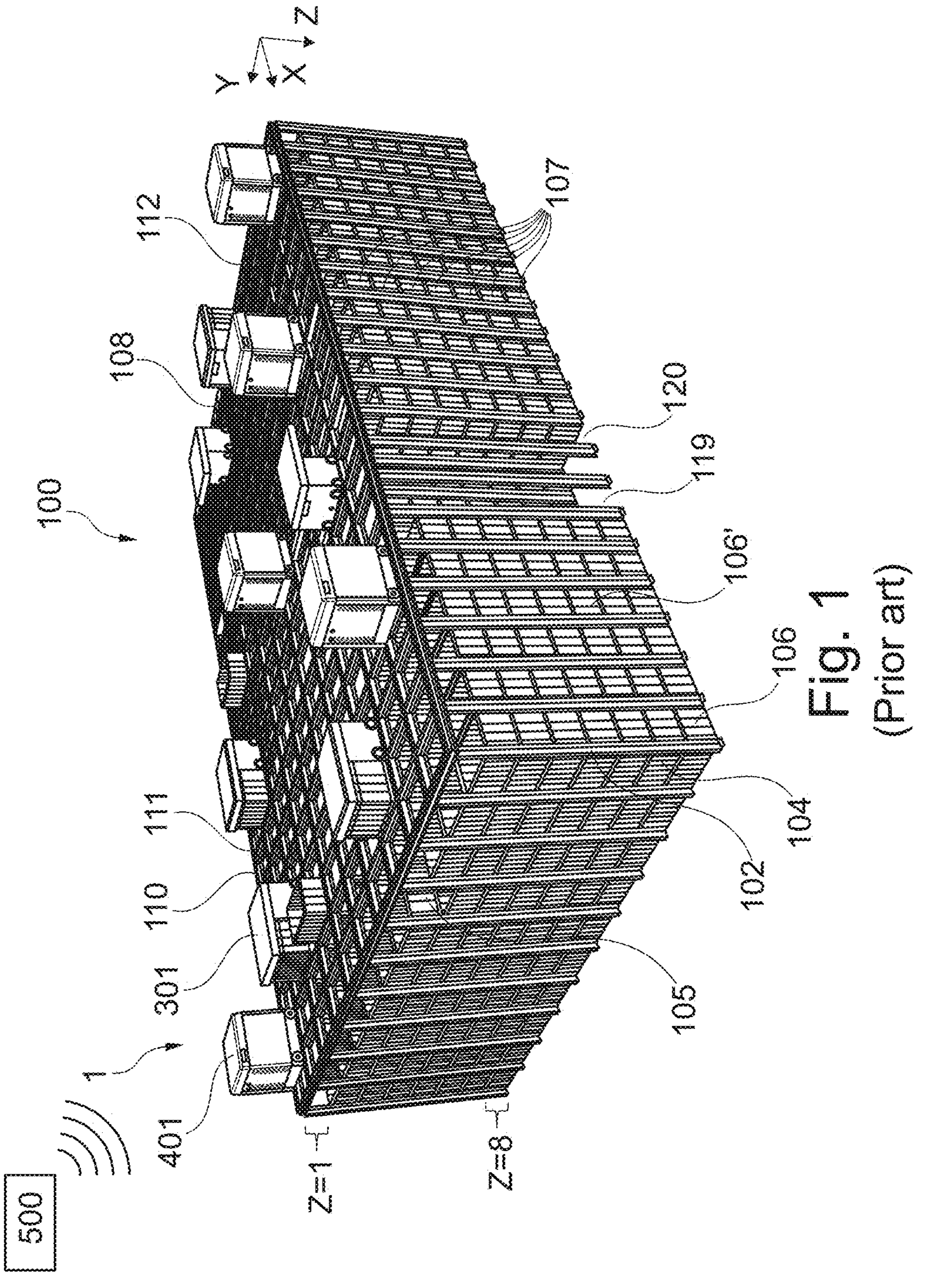
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figures 2, 3:
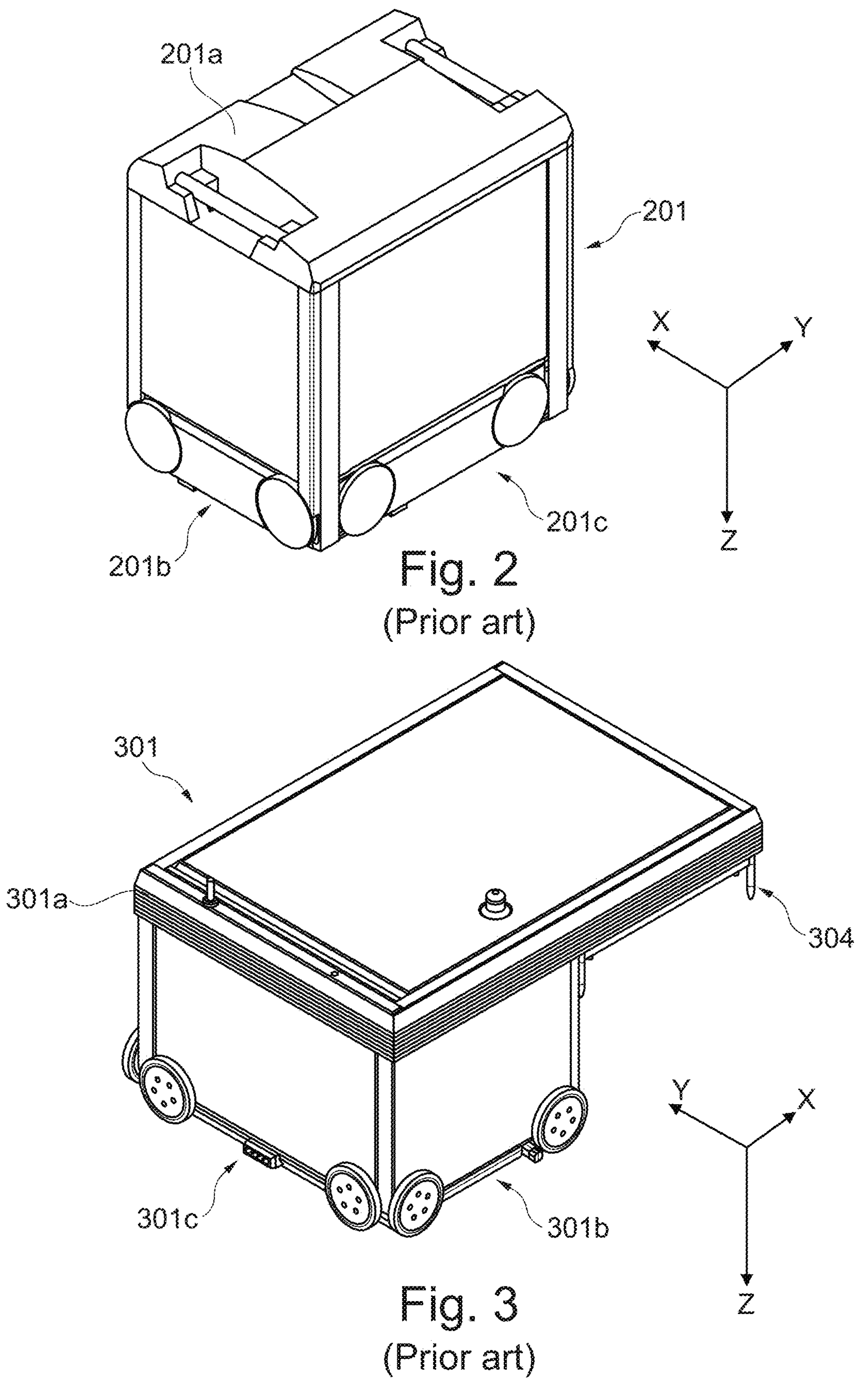
FIG. 2 is a perspective view of a prior art container handling vehicle having an internally arranged cavity for carrying storage containers therein.
FIG. 3 is a perspective view of a prior art container handling vehicle having a cantilever for carrying storage containers underneath.
Figure 4:
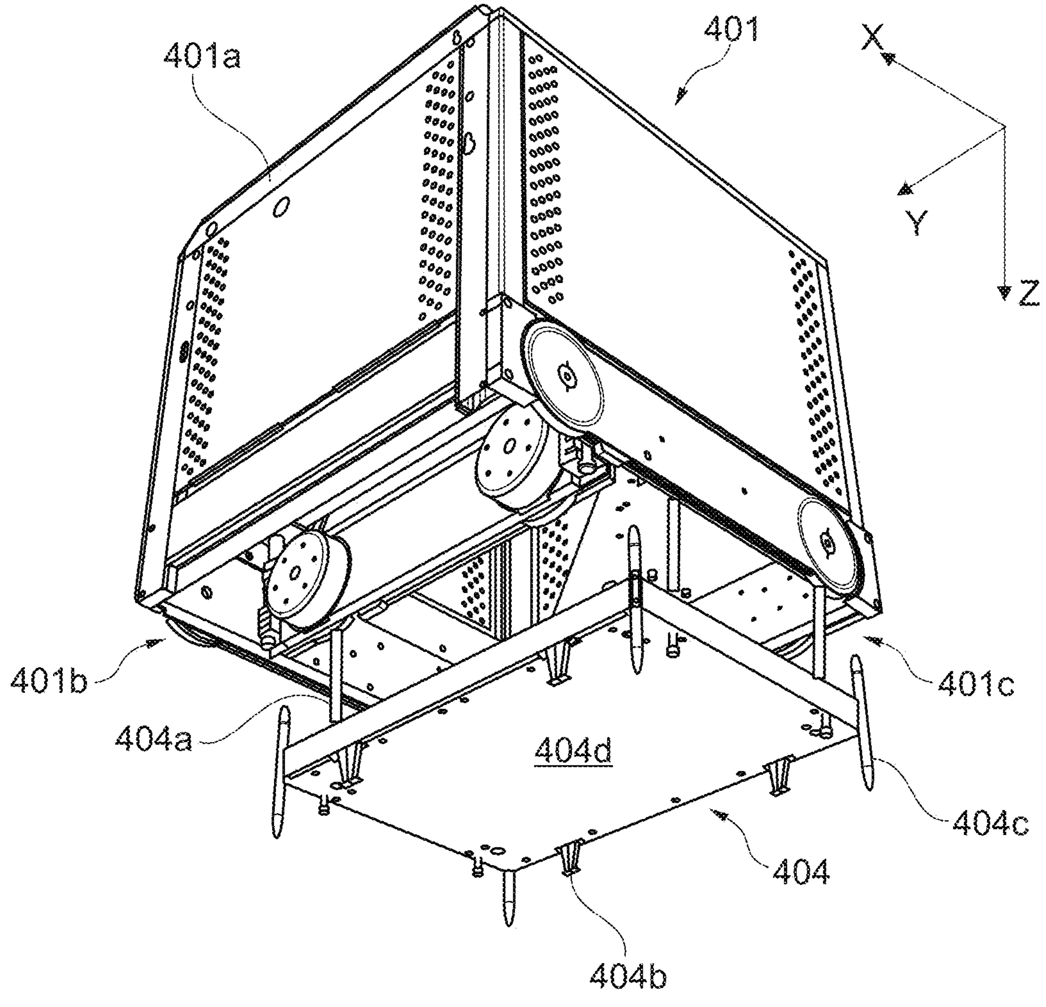
FIG. 4 is a perspective view, seen from below, of a prior art container handling vehicle having an internally arranged cavity for carrying storage containers therein.

The framework structure 100 of the automated storage and retrieval system 1 is constructed in a similar manner to the prior art framework structure 100 described above in connection with FIGS. 1-3. That is, the framework structure 100 comprises a number of upright members 102, and comprises a first, upper rail system 108 extending in the X direction and Y direction.

The framework structure 100 further comprises storage compartments in the form of storage columns 105 provided between the members 102 wherein storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS.

Figures 5A, 5B, 6A:
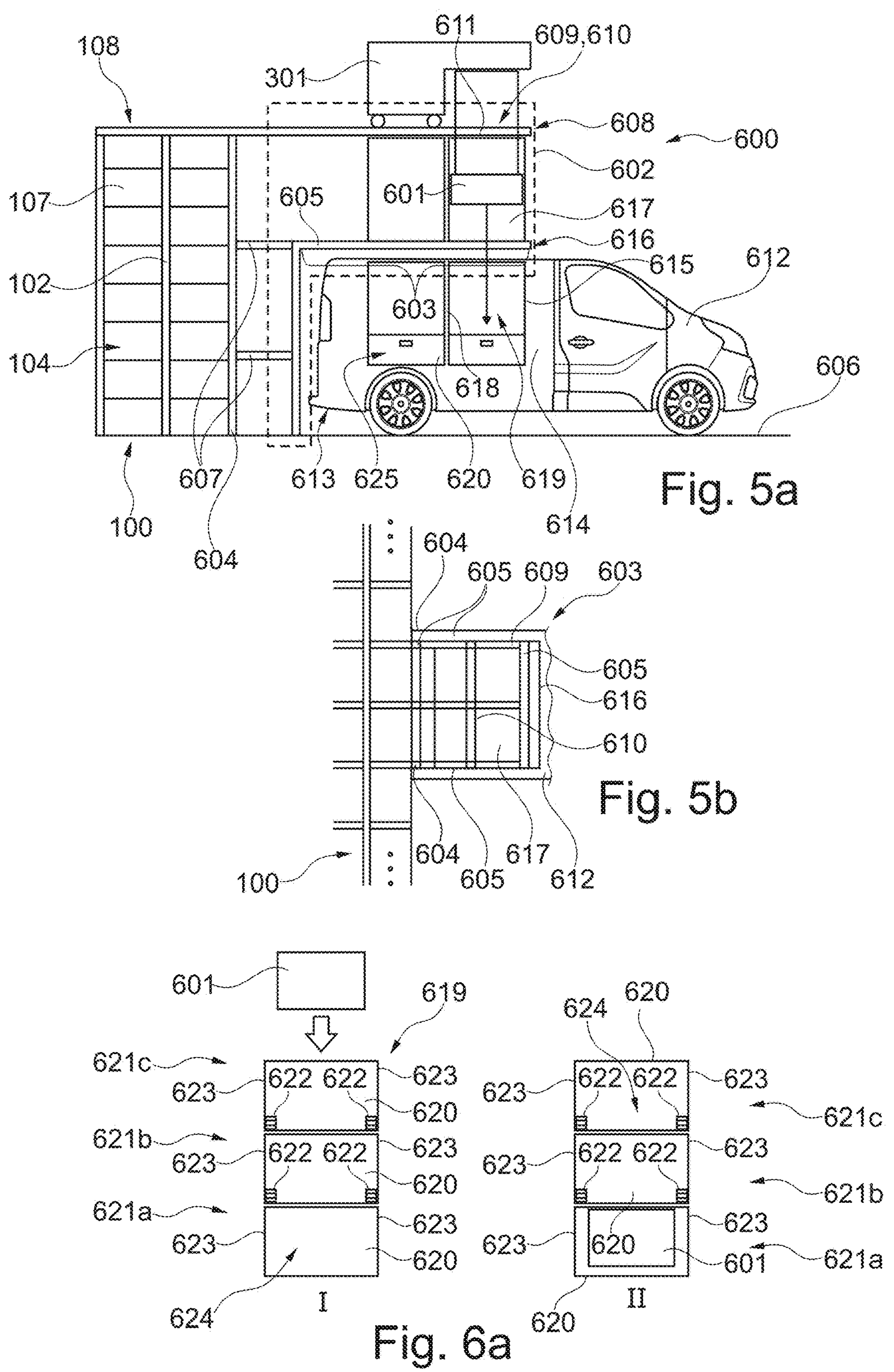
FIG. 5*a* shows a schematic view of a system for delivering storage containers.
FIG. 5*b* shows a schematic top view onto a transfer platform.
FIGS. 6*a* and 6*b* show a sequence for transferring a storage container into a carrier framework in a vehicle.

FIGS. 5*a* and 5*b* shows a system 600 for delivering storage containers in a schematic view. On the left-hand side, a part of an automated storage and retrieval system 1 with a storage grid 104 is illustrated. It comprises a framework structure 100 having upright members 102, between which vertical storage columns 105 are defined, and in which a plurality of storage containers 106 are stored in stacks 107. Above the columns 105, a rail system 108 is provided, which has a first set of parallel rails 110 and a second set of parallel rails 111, as explained with reference to FIG. 1. A remotely operated vehicle 301 is arranged on the rail system 108. The automated storage and retrieval system 1 may correspond to the system shown in FIG. 1 and may have any previously described feature. In particular, it may comprise at least one access port and/or picking port, in which orders are fulfilled by picking items out of a plurality of different storage containers 106 to place them into a delivery container 601. The delivery container 601 can be understood as a storage container 106, which is to be delivered. It may thus also be a usual storage container 106.

The system 600 for delivering storage containers comprises a transfer platform 602, which is connected to the framework structure 100. It forms a cantilever structure 603, which is arranged in an uppermost region of the framework structure 100. Exemplarily, it comprises a frame construction having vertical frame members 604 and horizontal frame members 605. The vertical frame members 604 may rest on or are attached to the ground 606, on which the framework structure 100 is placed. They may be connected to neighboring upright members 102 through connecting members 607 or the like. The horizontal members 605 laterally extend from a top end of the vertical frame members 604 and parallel to the ground 606.

On a top side 608 of the transfer platform 602, a first set of transfer platform rails 609 and a second set of transfer platform rails 610 forming a transfer platform rail system 611 are provided. Their spacing, size and alignment correspond to the rails 110 and 111 of the rail system 108 of the automated storage and retrieval system 1. The rails 110, 111, 609 and 610 are connected to each other, such that the transfer platform rails 609 and 610 extend the rail system 108 over the top end 608 of the transfer platform 602. Thus, the remotely operated vehicle 301 can simply pass from a location above the storage grid 104 onto the transfer platform 602 and back.

Beneath the cantilever structure 603, a vehicle 612 is placed. It is arranged on the ground 606 and a rear side 613 is placed directly in front of the vertical frame members 604. The vehicle 612 exemplarily comprises a cargo compartment 614, inside which a carrier framework 615 is integrated, i.e. connected to a vehicle structure or formed by the vehicle structure. Above the carrier framework 615, the vehicle 612 comprises an opening 616, through which the carrier framework 615 is accessible.

The transfer platform 602 comprises transfer grid cells 617, which may correspond in their horizontal cell arrangement and cell size to the horizontal cell arrangement and cell size of the storage cells in the storage grid 104. The transfer platform 602 may also be wider and comprise more than just two rows of transfer grid cells 617. Thus, the transfer platform 602 may be capable of transferring delivery containers 601 into carrier frameworks with different sizes or integrated in vehicles with different sizes. It is referred to FIGS. 7 to 9 for example, where two sets of carrier columns 704 are used that are spaced apart in a lateral direction. It is conceivable to use smaller carrier frameworks for integration into smaller vehicles, where two sets of carrier columns are used that are not spaced apart. In general, it may be preferred to arrange the carrier columns in a spatial grid that has a fixed grid dimension, with suitable grid points selected for the carrier columns depending on the size of the vehicle. The transfer grid cells 617 are open to their bottom sides and thus allow passing the delivery container one therethrough to reach the opening 616 of the vehicle 612.

The carrier framework 615 exemplarily corresponds to the framework structure 100 of this storage grid 104. Thus, it comprises upright members 618 forming carrier columns 619. The spacing and size of the carrier columns 619 corresponds to the spacing and size of the transfer grid cells 617. Thus, when the carrier framework 615 is arranged directly beneath the cantilever structure 603 in a correct alignment, the transfer grid cells 617 and the carrier columns 619 are flush above each other. The remotely operated vehicle 301 may then transfer the delivery container 601 from inside the storage grid 104 into the carrier framework 615 by retrieving it from the storage grid 104, transporting it to the transfer platform 602 and lowering it directly into one of the carrier columns 619. Removal of a delivery container 601 from the carrier framework 615 and storing it inside the storage grid 104 may be done in reverse.

As explained further below, the system 600 additionally provides selective access to the individual delivery containers 601 from outside the carrier framework 615 and/or from outside the vehicle 612 through access devices 620.

Figure 6B:
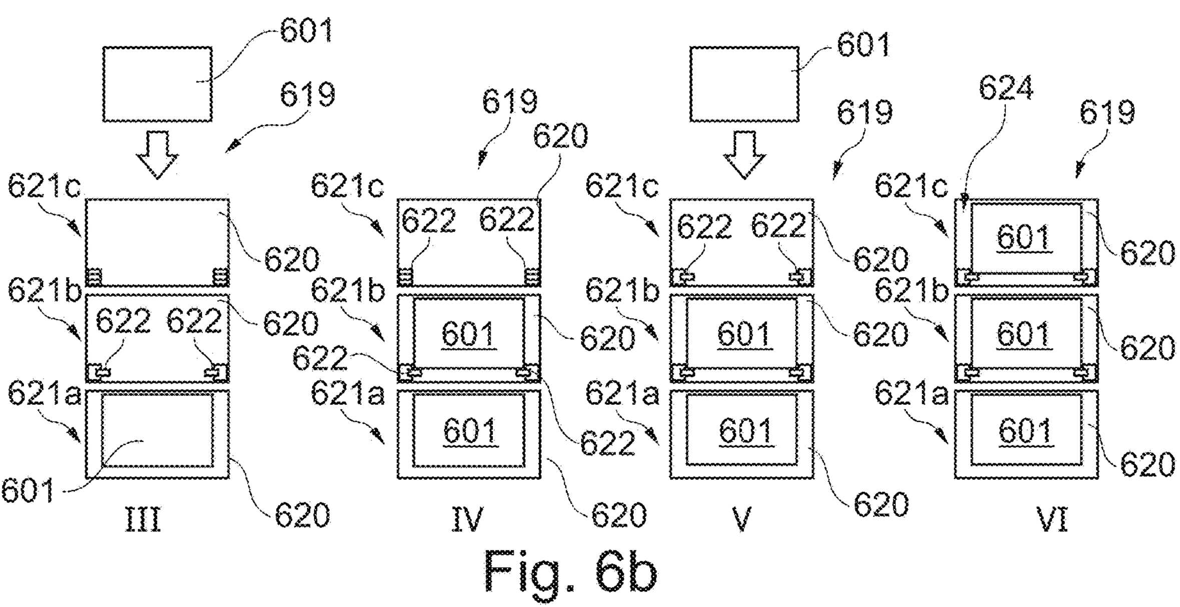

In FIGS. 6*a* and 6*b*, the transfer of delivery containers 601 into one of the carrier columns 619 of the carrier framework 615 is shown in a sequence having six steps I to VI. For illustration purposes, the upright members 618 of the carrier framework 615 are omitted. Exemplarily, the carrier column 619 comprises three storage spaces 621*a*, 621*b* and 621*c* in a vertical arrangement. In step I of the sequence, the delivery container 601 is places above the carrier column 619 and is in the process of being lowered by the remotely operated vehicle 301. This substantially corresponds to the illustration in FIG. 5*a*. As indicated by the downward arrow, the delivery container 601 is lowered towards the carrier column 619.

A lowermost storage space 621*a* is equipped with the access device 620, which exemplarily is realized as a drawer, into which the delivery container 601 will be placed. The drawer 620 may have a grid-like or substantially closed, surface-like base, on which a delivery container 601 can rest. The storage spaces 621*b* and 621*c* in the middle and at the top of the carrier column 619 have a drawer 620, too. However, in this example, these drawers 620 do not have a closed, surface-like base for supporting the delivery container 601 or the base has an opening for the delivery container 601 to pass through. Both drawers 620 in the storage spaces 621*b* and 621*c* have a plurality of linear solenoid pins 622 distributed on both drawer sides 623, i.e. on both drawer frames, at a bottom side of the respective drawer 620. Thus, the support surface for a delivery container 601 is only provided by the pins 622. The pins 622 can be actuated to move further into the interior space of the drawer 620 or in reverse. The pins 622 are dimensioned to carry a delivery container 601 only when the pins 622 are moved further into the interior space of the respective drawer 620, but let the delivery container 601 pass through the drawer 620 in a vertical direction, when the pins 622 are moved outwards, i.e. towards the sides of the respective drawer 620. Between the drawer sides 623 and a drawer front, a drawer compartment 624 is created. Here, the respective delivery container 601 can be stored.

In step I of the sequence, all pins 622 are in an outward position and the delivery container 601 that is lowered into the carrier column 619 will pass through both storage spaces 621*c* and 621*b* and reach the lowermost storage space 621*a* to be placed in the drawer. Step II shows the delivery container 601 in the drawer 620 at the lowermost storage space 621*a*.

In step III, the pins 622 of the drawer 620 in the middle storage space 621*b* are moved further into the interior space of the drawer 620. Consequently, a further delivery container 601 that is lowered into the carrier column will rest on the pins 622 and will thus remain in the drawer 620 in this storage space 621*b*. This is shown in step IV.

In step V, the pins 622 of the drawer 620 in the top storage space 621*c* are moved further into the interior space of the drawer 620. Thus, a further deliver container 601 lowered into the storage column 619 will rest on these pins 622 and will remain inside this drawer 620. This is shown with step VI.

Unloading the carrier column 619 can be made in reverse order. At first, the delivery container 601 from the top storage space 621*c* is removed. Afterwards, the pins 622 in the drawer 620 of the uppermost storage space 621*c* are moved outwards. Then, the delivery container 601 held in the drawer 620 of the middle storage space 621*b* is removed. Followed by this, the pins 622 of this drawer 620 are moved further outwards. Finally, the delivery container 601 of the lowermost storage space 621*a* is removed.

The solenoid pins 622 may be coupled with the control system 500 of the automated storage and retrieval system 1, to which the system 600 is connected. This may be accomplished by a control unit in the carrier framework 615, by small individually addressable and wirelessly communication controllers integrated into the drawers 620, by a control device provided in the vehicle 612 or by a combination. The control system 500 will then be able to selectively set the drawers 620 into one of the two possible states, i.e. a state where delivery containers 601 can pass through the drawer 620 or a state where delivery containers 601 are held by the drawer 620.

Instead of using pins 622, also common drawers 620 may be used that have a grid-like or substantially closed, surface-like base, on which a delivery container 601 can rest. In order to transfer delivery containers 601 into the drawers 620, all drawers 620 except on the lowermost level are pulled out into their picking positions, while the drawers 620 in the lowermost level stay in their receiving positions. The remotely operated vehicle 301 may then lower the respective delivery containers 601 into the drawers 620 of the lowermost level. Afterwards, the drawers 620 for the next level are pushed into their receiving positions and further delivery containers 620 are lowered into these. This may be done until all drawers 620 of all levels of the carrier framework 615 that need to be filled have been provided with a delivery container 601.

Figure 7:
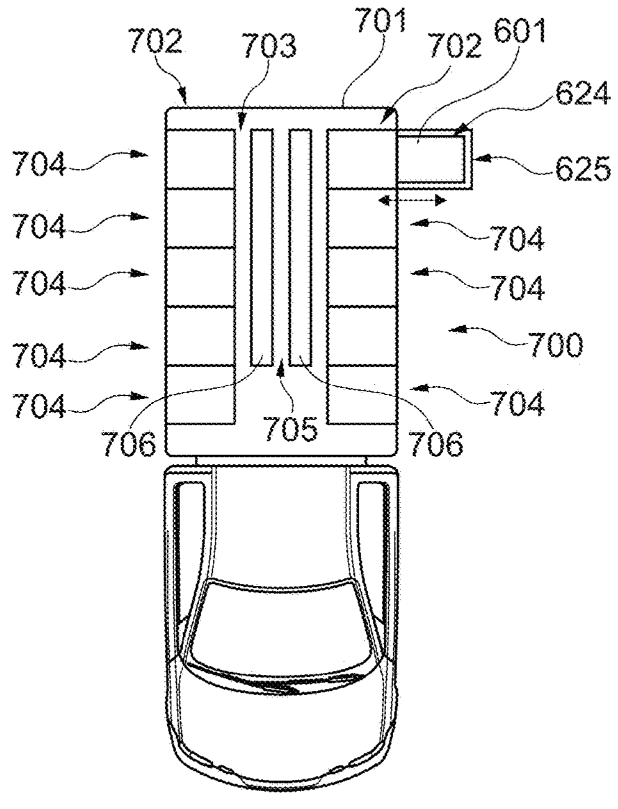
FIG. 7 shows a top view onto a vehicle.
Figure 8:
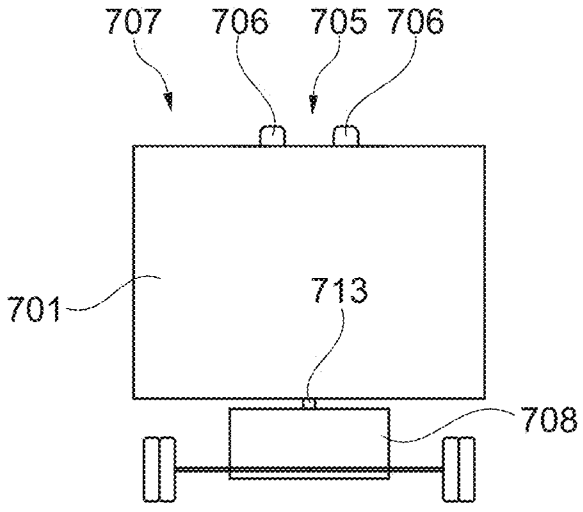
FIG. 8 shows a rear view onto a vehicle.
Figure 9:
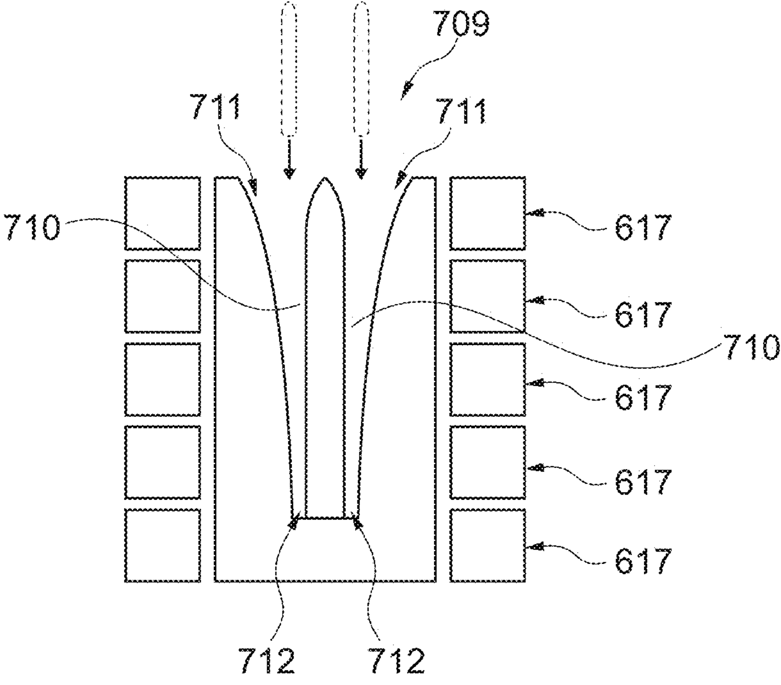
FIG. 9 shows a schematic bottom view onto a second guiding device beneath a transfer platform.

FIGS. 7 to 9 illustrate, how a vehicle having a carrier framework 615 may be aligned relative to the transfer platform 602. FIG. 7 shows a vehicle 700 in a schematic top view. The vehicle 700 is exemplarily realized in the form of a box truck, which has a box 701 that is arranged on the back of the vehicle 700. The box 701 provides or realizes the cargo compartment mentioned above.

In this example, the box 701 comprises two openings 702 at its top side. Under each opening 702 a lateral part 703*a* and 703*b* of a carrier framework 703 is arranged. The carrier framework 703 is attached to the interior of the box 701. In this example, each of the lateral parts 703*a* and 703*b* has five carrier columns 704. They may correspond to the carrier columns 619 shown in the previous figures. Each of the storage spaces has an access device 620 in the form of a drawer. One of the drawers 620 is pulled out into a picking position, in which a user can pick items out of the container 601 stored in the drawer 620. All other drawers 620 are in the receiving position, in which containers 601 may be brought into the drawers 620 or in which they are merely stored to allow the vehicle 700 to travel.

It is understood that the openings 702 can preferably be closed when the vehicle 700 is traveling. This may be achieved by a shutter-like mechanism, which is not shown herein. For the sake of illustration, the openings 702 are shown without a cover.

On the top of the box 701, a first guiding device 705 is provided and comprises two elongate and distanced first guiding bodies 706. They are position between the openings 702 and the carrier columns 704, respectively. The first guiding bodies 706 are arranged parallel to each other and extend along a substantial part of the carrier framework 703 parallel to a longitudinal axis of the vehicle 700.

FIG. 8 shows the vehicle 700 from its rear side in a schematic illustration. It is apparent that the first guiding bodies 706 extend in an upright manner from the top of the box 701.

In this exemplary embodiment, the box 701 is rotatably arranged on a frame 708 of the vehicle 700 around a rotary axis 713. It is to be understood that the support of the box 701 on the vehicle 700 should be realized in such a manner, that the vehicle 700 is roadworthy and can be certified for operation on public roads. Thus, it may comprise a plurality of latching devices, load absorbing supports, bearings, resting surfaces and/or the like to ensure that the box 701 is rigidly attached to the vehicle when it is traveling. However, when the vehicle is 700 operates on site to couple with a transfer platform 602 attached to the framework structure 100 of an automated storage and retrieval system 1, the latching devices or the like can be loosened or disengaged to allow a slight rotation of the box 701 relative to the frame 708 of the vehicle 700.

When approaching the transfer platform 602, the first guiding device 705 may engage with a second guiding device 709 arranged beneath the transfer platform 602 and shown in FIG. 9. The viewing direction is from the ground 606 vertically upwards towards the second guiding device 709.

It is assumed that the vehicle 700 moves rearwards, such that the rear end of the vehicle 700 approaches the transfer platform 602 first. The second guiding device 709 may be rigidly coupled with the ground 606, e.g. through a rigid frame. It is preferred that the second guiding device 709 is mechanically decoupled from the transfer platform 602 as well as the framework structure 100 to prevent the transfer of mechanical loads from the second guiding device 709 into the framework structure 100 of the storage grid 104.

The second guiding device 709 comprises two funneling guiding tracks 710 having a wide entrance region 711 and a narrow end region 712. They are arranged parallel to each other and are configured to receive and guide the first guiding bodies to the end region. The second guiding device 709 is arranged in such a distance to the ground 606 that allows the vehicle to reach under the second guiding device 709, but let the first guiding bodies 706 enter the entrance regions 711 of the tracks 710. By advancing the vehicle 700 further, the first guiding bodies 706 slide towards the narrow ends 712. As the tracks 710 are funneling, the available space for the first guiding bodies 706 decreases, such that will be automatically aligned in the tracks 710. When reaching the narrow ends 712, the first guiding bodies 706 will be aligned in a way that the carrier columns 704 are flush beneath the corresponding transfer grid cells 617 to allow an undisturbed lowering of delivery containers 601 into the carrier framework 702.

Figure 10:
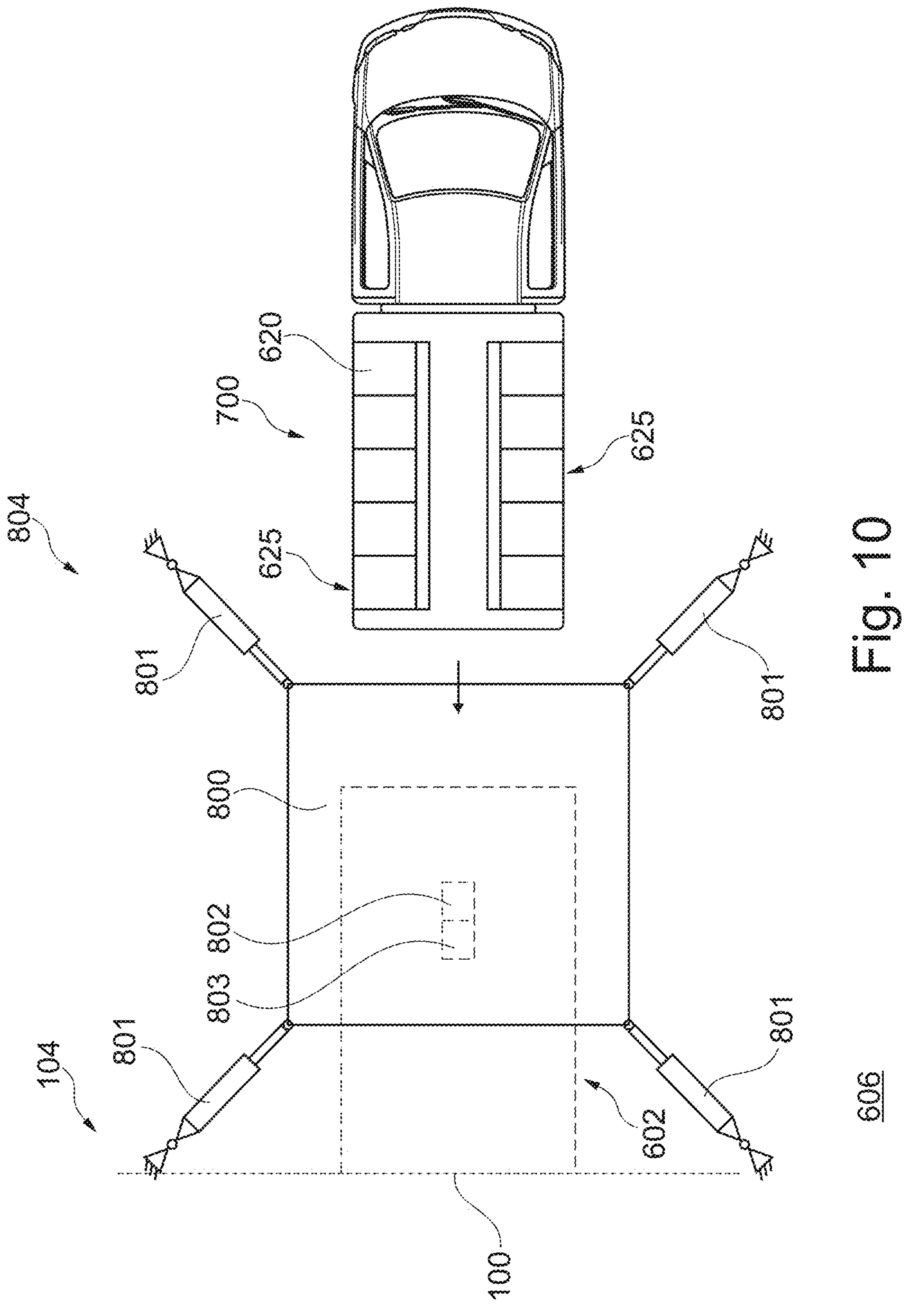
FIG. 10 shows a schematic top view onto a vehicle platform.

FIG. 10 illustrates a control arrangement 804 having a vehicle platform 800, which is movably supported on the ground 606. Exemplarily, four linear actuators 801 are connected to the vehicle platform 800 in a way that they can move and rotate the vehicle platform 800 horizontally. The vehicle 700 may enter the vehicle platform 800 and move towards the framework structure 100, which is shown in dashed lines together with the transfer platform 602. Exemplarily, a camera 802 is arranged underneath the transfer platform 602 and is configured to view onto the vehicle platform 800 and the vehicle standing on the vehicle platform 800, respectively. It is exemplarily connected to a control device 803, which in turn is coupled with the actuators 801. The control device 803 is configures to operate the actuators 801 in a way that the vehicle 700 and the carrier columns 704 are arranged flushly beneath the transfer grid cells 617.

It is understood that a self-driving vehicle may be programmed to approach the transfer platform 602 in a way that the carrier columns 704 will be arranged flushly beneath the transfer grid cells 617.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
112 Access opening
119 First port column
120 Second port column
201 Prior art container handling vehicle
201*a* Vehicle body of the container handling vehicle 201
201*b* Drive means/wheel arrangement/first set of wheels in first direction (X)
201*c* Drive means/wheel arrangement/second set of wheels in second direction (Y)
301 Prior art cantilever container handling vehicle
301*a* Vehicle body of the container handling vehicle 301
301*b* Drive means/first set of wheels in first direction (X)
301*c* Drive means/second set of wheels in second direction (Y)
304 Gripping device
401 Prior art container handling vehicle
401*a* Vehicle body of the container handling vehicle 401
401*b* Drive means/first set of wheels in first direction (X)

401*c* Drive means/second set of wheels in second direction (Y)
404 Gripping device
404*a* Lifting band
404*b* Gripper
404*c* Guide pin
404*d* Lifting frame
500 Control system
600 System for delivering storage containers
601 Delivery container/Storage container to be delivered 601
602 Transfer platform
603 Cantilever structure
604 Vertical frame member
605 Horizontal frame member
606 Ground
607 Connecting member
608 Top side
609 First set of transfer platform rail
610 Second set of transfer platform rails
611 Transfer platform rail system
612 Vehicle
613 Rear side
614 Cargo compartment
615 Carrier framework
616 Opening
617 Transfer grid cell
618 Upright member
619 Carrier column
620 Access device/drawer
621*a* Storage space
621*b* Storage space
621*c* Storage space
622 Solenoid pins
623 Drawer side
624 Drawer compartment
625 Drawer front
700 Vehicle
701 Box
702 Opening
703 Carrier framework
703*a* Lateral part
703*b* Lateral part
704 Carrier column
705 First guiding device
706 First guiding body
708 Frame
709 Second guiding device
710 Guiding track
711 Entrance region
712 End region
713 Rotary axis
800 Vehicle platform
801 Linear actuator
802 Camera
803 Control device
804 Control arrangement
I-VI Step (of sequence)
X First direction
Y Second direction
Z Third direction

What is claimed is:

1. A system for delivering storage containers, comprising:
a vehicle;
a carrier framework for integration into a cargo compartment of the vehicle, and
a transfer platform,
wherein the carrier framework is a spatial framework configured to store a plurality of storage containers to be delivered in a plurality of individual storage spaces forming a carrier grid having vertical carrier columns,
wherein the carrier framework comprises at least one access device configured to selectively present the individual storage containers received by and stored in the carrier framework to a user outside the carrier framework or outside the vehicle into which the carrier framework is integrated,
wherein the carrier framework is integrated into the vehicle,
wherein the vehicle has a vehicle opening above the carrier framework for vertically moving a storage container of the plurality of storage containers therethrough into or out of the carrier framework,
wherein the transfer platform is connectable to or integratable into a framework structure of a storage grid of an automated storage and retrieval system to form a cantilever structure at the storage grid, beneath which the carrier framework or the vehicle, into which the carrier framework is integrated, is placeable,
wherein the transfer platform has a transfer grid having a plurality of transfer grid cells, for receiving the storage container from or for sending the storage container into the framework structure of the storage grid,
wherein the transfer grid cells are open at their bottom, and
wherein the carrier grid and the transfer grid correlate in their horizontal cell arrangement and cell size, such that, when the carrier columns are arranged beneath the transfer grid cells, the storage containers can be lowered from the transfer platform into the carrier framework.

2. The system according to claim 1,
wherein the transfer platform has a horizontal footprint that at least corresponds to a horizontal footprint of the carrier.

3. The system according to claim 1,
wherein the transfer platform has at least one set of transfer platform rails arranged on a top side of the transfer platform for allowing a remotely operated vehicle to move on the transfer platform for moving the storage container on the transfer platform,
wherein the at least one set of transfer platform rails is connectable to a rail set of the automated storage and retrieval system, and
wherein the transfer grid cells have at least one opening configured to allow the remotely operated vehicle to pass the storage container vertically therethrough.

4. The system according to claim 1,
comprising a guiding apparatus arranged on top of the carrier framework or above the carrier framework for guiding the storage container that is moved vertically from the transfer platform into the carrier framework.

5. The system according to claim 1,
wherein the at least one access device comprises a drawer having a drawer compartment for accommodating the storage container,
wherein the drawer is movable between a receiving position for receiving the storage container, and a picking position for presenting the storage container to a user, and
wherein the drawer is fully retracted into the carrier framework in the receiving position.

6. The system according to claim 5, wherein an access device having a drawer is located in each of the individual storage spaces of the carrier framework.

7. The system according to claim 1, wherein the carrier framework or the vehicle into which the carrier framework is integrated is movable and arrestable in a predetermined position relative to the transfer platform.

8. The system according to claim 1, comprising a control arrangement configured to align the carrier framework relative to the transfer platform.

9. An automated storage and retrieval system, comprising:

a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells, each comprising a grid opening defined by a pair of neighboring rails of the first set of rails and a pair of neighboring rails of the second set of rails;

a storage grid having a framework structure configured to store a plurality of storage containers in stacks in vertical storage columns, which are provided between upright members, wherein each storage column is located vertically below a grid opening beneath the rail system;

at least one remotely operated vehicle for handling a storage container, the at least one remotely operated vehicle being configured to move on the rail system above the storage columns; and at least one system for delivering storage containers, comprising:

a carrier framework that is integrated into a cargo compartment of a vehicle, wherein the vehicle has a vehicle opening above the carrier framework for vertically moving the storage container therethrough into or out of the carrier framework, and a transfer platform, wherein the carrier framework is a spatial framework configured to store a plurality of storage containers to be delivered in a plurality of individual storage spaces forming a carrier grid having vertical carrier columns, wherein the carrier framework comprises at least one access device configured to selectively present the individual storage containers received by and stored in the carrier framework to a user outside the carrier framework or outside the vehicle into which the carrier framework is integrated, wherein the transfer platform is connectable to or integratable into the framework structure of the storage grid of the automated storage and retrieval system to form a cantilever structure at the storage grid, beneath which the carrier framework or the vehicle, into which the carrier framework is integrated, is placeable, wherein the transfer platform has a transfer grid having a plurality of transfer grid cells, for receiving the storage container from or for sending the storage container into the framework structure of the storage grid, wherein the transfer grid cells are open at their bottom, wherein the carrier grid and the transfer grid correlate in their horizontal cell arrangement and cell size, such that, when the carrier columns are arranged beneath the transfer grid cells, storage containers can be lowered from the transfer platform into the carrier framework, and wherein the transfer platform is connected to or integrated into the framework structure.

10. The automated storage and retrieval system according to claim 9, wherein the remotely operated vehicle is configured to move the storage container from the storage grid to the transfer platform.

11. A method for delivering a storage container, comprising:

arranging a vehicle, which comprises a cargo compartment having a carrier framework, at a transfer platform, which is connected to a framework of a storage grid of an automated storage and retrieval system, wherein the carrier framework is integrated into the vehicle and wherein the vehicle has a vehicle opening above the carrier framework for vertically moving a storage container therethrough into or out of the carrier framework, retrieving at least one storage container from the storage grid by a remotely operated vehicle operating on the automated storage and retrieval system, moving the at least one storage container to the transfer platform, and moving the at least one storage container from the transfer platform into the carrier framework by means of the remotely operated vehicle, wherein the carrier framework comprises at least one access device configured to selectively present the at least one storage container from outside the carrier framework or from outside the vehicle into which the carrier framework is integrated.

12. The method according to claim 11, wherein arranging the vehicle comprises arranging the vehicle beneath a cantilever structure of the transfer platform.

13. The method according to claim 11, wherein the remotely operated vehicle lowers the at least one storage container from the transfer platform through an opening above the carrier framework into the carrier framework.

14. A method for transforming a warehouse having a grid-based automated storage and retrieval system into an end customer delivery arrangement, comprising:

providing a system for delivering storage containers, comprising:

a carrier framework that is integrated into a cargo compartment of a vehicle, wherein the vehicle has a vehicle opening above the carrier framework for vertically moving a storage container therethrough into or out of the carrier framework, and a transfer platform, wherein the carrier framework is a spatial framework configured to store a plurality of storage containers to be delivered in a plurality of individual storage spaces forming a carrier grid having vertical carrier columns, wherein the carrier framework comprises at least one access device configured to selectively present the individual storage containers received by and stored in the carrier framework to a user outside the carrier framework or outside a vehicle into which the carrier framework is integrated, wherein the transfer platform is connectable to or integratable into a framework structure of a storage grid of an automated storage and retrieval system to form a cantilever structure at the storage grid, beneath which the carrier framework or a vehicle, into which the carrier framework is integrated, is placeable, wherein the transfer platform has a transfer grid having a plurality of transfer grid cells, for receiving the storage container from or for sending the storage container into the framework structure of the storage grid, wherein the transfer grid cells are open at their bottom, and wherein the carrier grid and the transfer grid correlate in their horizontal cell arrangement and cell size, such that, when the carrier columns are arranged beneath the transfer grid cells, the storage containers can be lowered from the transfer platform into the carrier framework, and connecting the transfer platform of the system to a framework structure of the automated storage and retrieval system.

* * * * *